United States Patent [19]

Neeff et al.

[11] 4,284,411

[45] Aug. 18, 1981

[54] ANTHRAQUINONE DERIVATIVES FOR PIGMENTING ORGANIC MACROMOLECULAR SUBSTANCES

[75] Inventors: Rütger Neeff; Meinhard Rolf; Walter Müller, all of Leverkusen, Fed. Rep. of Germany

[73] Assignee: Bayer Aktiengesellschaft, Leverkusen, Fed. Rep. of Germany

[21] Appl. No.: 59,004

[22] Filed: Jul. 19, 1979

[30] Foreign Application Priority Data

Aug. 10, 1978 [DE] Fed. Rep. of Germany ....... 2835067

[51] Int. Cl.³ .......................... D06P 3/52; C09B 1/16
[52] U.S. Cl. ........................................... 8/506; 8/508; 8/509; 8/510; 8/513; 8/514; 8/515; 8/516; 8/518; 8/519; 8/637; 8/677; 542/415; 8/512
[58] Field of Search ...................... 8/4, 5, 7, 506, 519, 8/518, 508, 513, 514, 516, 515, 509, 510, 677; 542/415

[56] References Cited

U.S. PATENT DOCUMENTS

| | | | |
|---|---|---|---|
| 2,515,878 | 7/1950 | Knott | 542/415 |
| 3,560,491 | 2/1971 | Neeff | 542/415 |
| 4,078,086 | 3/1978 | Winkelmann et al. | 542/415 |

FOREIGN PATENT DOCUMENTS 2025429 12/1971 Fed. Rep. of Germany.
51-140926 12/1976 Japan.

*Primary Examiner*—A. Lionel Clingman
*Attorney, Agent, or Firm*—Sprung, Felfe, Horn, Lynch & Kramer

[57] ABSTRACT

Anthraquinone derivatives which in one of their tautomeric structures correspond to the formula

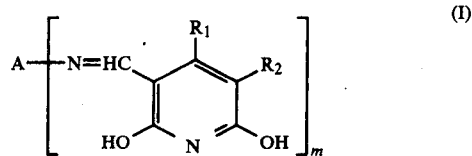

in which
A denotes an anthraquinone radical which is free from sulphonic acid groups, is optionally further substituted and preferably consists of at most 5 fused rings,
m is a number from 1–4 and preferably 1 or 2,
$R_1$ is hydrogen or a $C_1$–$C_4$-alkyl group and
$R_2$ is a cyano group or a radical of the formula —$COOR_3$ or

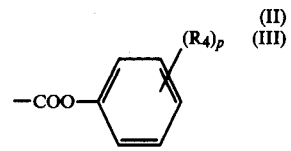

or a radical of the formula

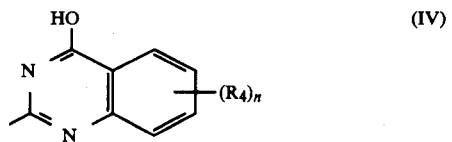

in which formulae
$R_3$ is hydrogen, a straight-chain or branched alkyl group of a cycloalkyl radical,
$R_4$ is a substituent,
n is 0, 1, 2, 3 or 4 and
p is 0, 1, 2, 3, 4 or 5, processes for their preparation and their use for pigmenting organic macromolecular substances.

11 Claims, No Drawings

ANTHRAQUINONE DERIVATIVES FOR PIGMENTING ORGANIC MACROMOLECULAR SUBSTANCES

The invention relates to anthraquinone derivatives which in one of their tautomeric structures correspond to the formula

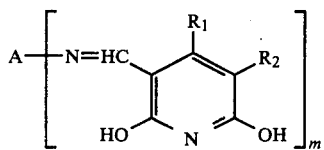  (I)

processes for their preparation and their use as pigments.

Further tautomeric forms of the compounds according to the invention correspond to the formula

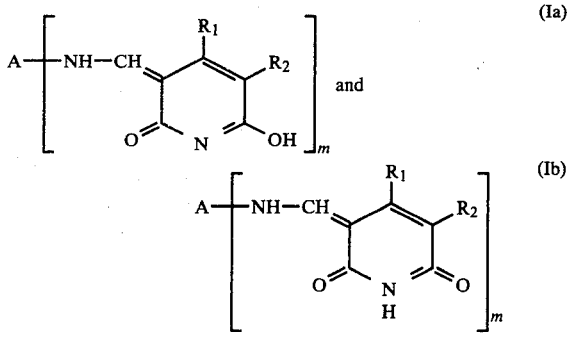

In formula I:
A denotes an anthraquinone radical which is free from sulphonic acid groups, is optionally further substituted and preferably consists of at most 5 fused rings,
m is a number from 1–4 and preferably 1 or 2,
$R_1$ is hydrogen or a $C_1$–$C_4$-alkyl group and
$R_2$ is a cyano group or a radical of the formula

 —COOR$_3$  (III)

or a radical of the formula

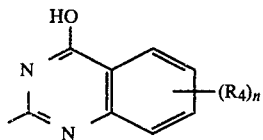  (IV)

in which formulae
$R_3$ is hydrogen, a straight-chain or branched alkyl group or a cycloalkyl radical,
$R_4$ is a substituent,
n is 0, 1, 2, 3 or 4 and
p is 0, 1, 2, 3, 4 or 5.

Suitable substituents $R_4$ are, for example, halogen, such as chlorine and bromine, $C_1$–$C_4$-alkyl, $C_1$–$C_4$-alkoxy, nitro, trifluoromethyl, cyano, optionally substituted carbamoyl and sulphamoyl, acylamino or acrylamino.

Possible substituents of the carbamoyl and sulphamoyl groups are preferably $C_1$–$C_4$-alkyl- and phenyl and benzyl which are optionally substituted by $C_1$–$C_4$-alkyl, $C_1$–$C_4$-alkoxy, fluorine, chlorine, bromine or nitro. Acyl groups which may be mentioned are, in particular, ($C_1$–$C_4$-alkyl)-carbonyl and benzoyl which is optionally substituted in the benzene nucleus by ($C_1$–$C_4$-alkyl)chloro, $C_1$–$C_4$-alkoxy or nitro. Arylamino is in particular phenylamino which is optionally substituted by $C_1$–$C_4$-alkyl, $C_1$–$C_4$-alkoxy, fluorine, chlorine, bromine or nitro.

As will be shown further below, amino-anthraquinones of the formula

 A—NH$_2$)$_m$  (V)

in which A and m possess the meaning indicated above, are used for the preparation of the anthraquinone derivatives (I).

Suitable amino-anthraquinones of the formula (V) are, for example: 1-amino-anthraquinone, 2-aminoanthraquinone, 1-amino-2-chloroanthraquinone, 1-amino-4-chloroanthraquinone, 1-amino-5-chloroanthraquinone, 1-amino-6-chloroanthraquinone, 1-amino-6-(7)-chloroanthraquinone (mixture), 1-amino-5,8-dichloroanthraquinone, 1-amino-2-bromoanthraquinone, 1-amino-2,4-dibromoanthraquinone, 1-amino-6,7-dichloroanthraquinone, 1-amino-6-fluoroanthraquinone, 1-amino-7-fluoroanthraquinone, 1-amino-6,7-difluoroanthraquinone, 2-amino-1-chloroanthraquinone, 2-amino-3-chloroanthraquinone, 2-amino-3-bromoanthraquinone, 1-amino-4-nitroanthraquinone, 1-amino-5-nitroanthraquinone, 1-amino-2-methylanthraquinone, 1-amino-2-methyl-4-chloroanthraquinone, 1-amino-2-methyl-4-bromoanthraquinone, 1-aminoanthraquinone-2-carboxylic acid, 1-aminoanthraquinone-2-carboxylic acid amide, methyl 1-aminoanthraquinone-2-carboxylate, 1-amino-4-nitroanthraquinone-2-carboxylic acid, 1-amino-2-acetylanthraquinone, 1-amino-5-benzoylaminoanthraquinone, 1-amino-4-benzoylaminoanthraquinone, 1-amino-4-hydroxyanthraquinone, 1-amino-5-hydroxyanthraquinone, 1-amino-4-methoxyanthraquinone, 1-amino-2-methoxy-4-hydroxyanthraquinone, 1-amino-4-methylaminoanthraquinone, 1-amino-4-cyclohexylaminoanthraquinone, 1-amino-4-anilinoanthraquinone, 1-amino-6-methylmercaptoanthraquinone, 2-phenyl-6-amino-4,5-phthaloylbenzimidazole, 6-chloro-2-amino-3,4-phthaloylacridone, 7-chloro-2-amino-3,4-phthaloylacridone, 5-chloro-8-amino-3,4-phthaloylacridone, 3-methyl-6-amino-anthrapyridone, 3-methyl-7-amino-anthrapyridone, 4-amino-1,9-pyrazolanthrone, 5-amino-1,9-pyrazolanthrone, 4-amino-1,9-anthrapyrimidine, 5-amino-1,9-anthrapyrimidine, 1,5-diaminoanthraquinone, 1,4-diaminoanthraquinone, 1,8-diaminoanthraquinone, 2,6-diaminoanthraquinone, 1,5-diamine-4-chloroanthraquinone, 1,4-diamino-5-nitroanthraquinone, 1,5-diamino-2,4,6,8-tetrabromoanthraquinone, 1,5-diamino-4,8-dihydroxyanthraquinone, 1,8-diamino-4,5-dihydroxyanthraquinone, 4,4'-diamino-1,1'-dianthrimide, 1-amino-8-benzoylaminoanthraquinone and 1-amino-2-bromo-4-(4-methylphenylsulphonylamino)-anthraquinone.

In one of their tautomeric structures, preferred anthraquinone derivatives correspond to the formula

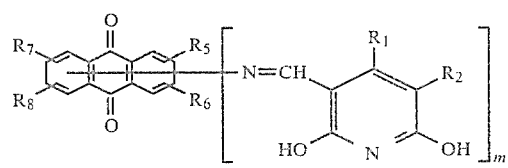

wherein $R_1$, $R_2$ and m have the meaning indicated above and $R_5$ denotes hydrogen, halogen, such as fluorine, chlorine and bromine, nitro, $C_1-C_4$-alkyl, $C_1-C_4$-alkoxy, $C_1-C_4$-alkylamino, benzylamino, cyclohexylamino, $C_1-C_4$-alkylmercapto, phenylmercapto which is optionally substituted by $C_1-C_4$-alkyl, $C_1-C_4$-alkoxy, fluorine, chlorine, bromine or nitro, ($C_1-C_4$-alkyl)-carbonyl, ($C_1-C_4$-alkoxy)-carbonyl, phenylamino which is optionally substituted by $C_1-C_4$-alkyl, $C_1-C_4$-alkoxy, chlorine or nitro, carbamoyl which is optionally monosubstituted or disubstituted by $C_1-C_4$-alkyl, benzyl or phenyl, it being possible for phenyl to be substituted by $C_1-C_4$-alkyl, $C_1-C_4$-alkoxy, fluorine, chlorine, bromine or nitro, carboxyl, hydroxyl, ($C_1-C_4$-alkyl)-carbonylamino or benzoylamino which is optionally substituted by $C_1-C_4$-alkyl, $C_1-C_4$-alkoxy, chlorine, bromine or nitro, . . . phenylsulphonylamino . . . substituted . . . $C_1-C_4$-alkyl, $C_1-C_4$-alkoxy, fluorine, chlorine, bromine or nitro, $R_6$ is hydrogen, chlorine or hydroxyl, $R_7$ is hydrogen, halogen, such as fluorine, chlorine or bromine, nitro, $C_1-C_4$-alkyl, $C_1-C_4$-alkoxy, $C_1-C_4$-alkylamino, $C_1-C_4$-alkylmercapto, phenylmercapto which is optionally substituted by $C_1-C_4$-alkyl, $C_1-C_4$-alkoxy, fluorine, chlorine, bromine or nitro, ($C_1-C_4$-alkoxy)-carbonyl, ($C_1-C_4$-alkyl)-carbonyl, benzylamino, cyclohexylamino, phenylamino which is optionally substituted by $C_1-C_4$-alkyl, $C_1-C_4$-alkoxy, chlorine, bromine or nitro, carboxyl, hydroxyl, carbamoyl which is optionally monosubstituted or disubstituted by $C_1-C_4$-alkyl, benzyl or phenyl, it being possible for phenyl to be substituted by $C_1-C_4$-alkyl, $C_1-C_4$-alkoxy, fluorine, chlorine, bromine or nitro, ($C_1-C_4$-alkyl)-carbonylamino, benzoylamino which is optionally substituted by $C_1-C_4$-alkyl, $C_1-C_4$-alkoxy, chlorine, bromine or nitro, $C_1-C_4$-alkylsulphonylamino or phenylsulphonylamino which is optionally substituted by $C_1-C_4$-alkyl, $C_1-C_4$-alkoxy, fluorine, chlorine, bromine or nitro, and $R_8$ is hydrogen, halogen, such as fluorine, chlorine and bromine, or hydroxyl.

Particularly preferred anthraquinone derivatives are those which in one of their tautomeric structures correspond to the formula

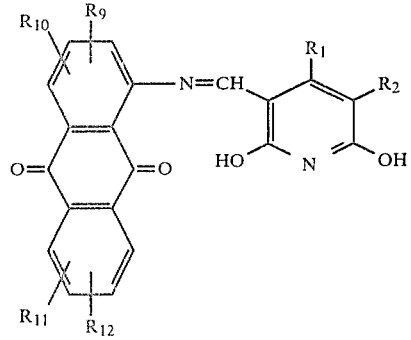

in which $R_1$ and $R_2$ have the meaning indicated above and $R_9$, $R_{10}$, $R_{11}$ and $R_{12}$ denote hydrogen, chlorine, bromine, carboxyl, $C_1-C_4$-alkoxycarbonyl. Carbamoyl, ($C_1-C_4$-alkyl)-carbonylamino, benzoylamino which is optionally substituted by 1 or 2 nitro or 1 to 5 chlorines or bromines, $C_1-C_4$-alkylsulphonylamino or phenylsulphonylamino which is optionally substituted by methyl, methoxy or chlorine, or a radical of the formula

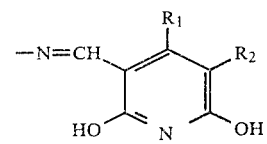

The preparation of the anthraquinone derivatives (I) from the aminoanthraquinones of the formula

and the 2,6-dihydroxy-pyridines which are correspondingly substituted in the 3-position and 4-position and have the formula

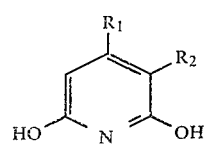

in which $R_1$ and $R_2$ have the meaning indicated above, can be effected by several processes.

(1) The 2,6-dihydroxypyridines which are correspondingly substituted in the 3-position and 4-position and have the formula (IX) are subjected to a condensation reaction, in an organic solvent which is inert towards the reactants, at 100°–220° C. with a trialkyl orthoformate of the formula

in which R preferably represents a $C_1-C_4$-alkyl group, and the resulting 2-hydroxy-5-alkoxymethylene-6-oxo-5,6-dihydro-pyridines correspondingly substituted in the 3-position and 4-position

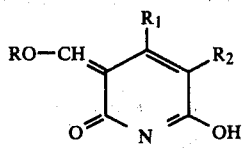

in which $R_1$ and $R_2$ have the meaning indicated above, are reacted, in the same reaction medium or in another organic reaction medium, at 100°–220° C. and preferably 120°–180° C. with an amino-anthraquinone of the formula $$A(NH_2)_m \qquad (V)$$

(2) The amino-anthraquinones of the formula $$A-NH_2)_m \qquad (V)$$

are subjected to a condensation reaction, in an organic solvent which is inert towards the reactants, at 100°–220° C. and preferably 120°–180° C., with a trialkyl orthoformate of the formula (X) indicated above and the resulting formimino-esters of the formula $$A-N=CH-OR)_m \qquad (XII)$$

in which
R preferably represents a $C_1$–$C_4$-alkyl group and
m has the meaning indicated above,
is then reacted, in the same reaction medium or in another organic reaction medium, at 100°–220° C. and preferably 120°–180° C., with 2,6-dihydroxy-pyridines which are correspondingly substituted in the 3-position and 4-position and have the formula (IX) indicated above.

Suitable organic solvents for processes (1) and (2) are aromatic and hetero-aromatic compounds, such as toluene, chlorobenzene, pyridine, o-dichlorobenzene, 1,2,4-trichlorobenzene and nitrobenzene, alcohols, such as butanol, diethylene glycol monomethyl ether, ethers, such as ethylene glycol dimethyl ether or ethylene glycol diethyl ether, or dipolar aprotic solvents, such as dimethylformamide, dimethylacetamide, N-methylpyrrolidone, tetramethylurea, dimethylsulphoxide or tetramethylenesulphone.

(3) In a further process, the amino-anthraquinones of the formula $$A-NH_2)_m \qquad (V)$$

are converted at 40°–100° C. and preferably 40°–80° C. in an organic solvent which is inert towards the reactants, using a dialkylformamide and a thionyl halide, especially thionyl chloride, to the corresponding formamidinium halides of the formula $$A-NH-CH=N^+(R)_2]_m(X^-)_m \qquad (XIII)$$

in which
R preferably represents a $C_1$–$C_4$-alkyl group
X represents chlorine or bromine and
m has the meaning indicated above,
and the resulting formamidinium halides (XIII) are subjected to a condensation reaction, in the same organic solvent or in another organic solvent, at 100°–220° C. and preferably 120°–180° C., in the presence of an acid-binding agent, with 2,6-dihydroxy-pyridines which are correspondingly substituted in the 3-position and 4-position and have the formula (IX) indicated above.

Suitable organic solvents for process (3) are, in particular, aromatic hydrocarbons, such as toluene, chlorobenzene, o-dichlorobenzene, 1,2,4-trichlorobenzene and nitrobenzene, ethers, such as ethylene glycol dimethyl ether or ethylene glycol diethyl ether, or dipolar aprotic solvents, such as dimethylformamide, diethylformamide, N-methylpyrrolidone, dimethylsulphoxide or tetramethylenesulphone.

The dialkylformamides used are preferably lower dialkylformamides, such as dimethyl- or diethyl-formamides, but cyclic alkyl-carboxylic acid amides such as N-methylpyrrolidone can also be employed.

The acid-binding agents used in process (3) are alkali metal hydroxides or carbonates or alkaline earth metal hydroxides or carbonates or alkali metal salts or alkaline earth metal salts of aliphatic carboxylic acids, preferably sodium carbonate, bicarbonate or acetate or potassium carbonate, bicarbonate or acetate.

The compounds of the formula I are obtained in a form suitable for use as a pigment or can be converted to the suitable form by after-treatment processes which are in themselves known, for example by dissolving or swelling in strong inorganic acids, such as sulphuric acid, and discharging onto ice. The state of fine division can also be achieved by grinding, with or without grinding acids such as inorganic salts or sand, and optionally in the presence of solvents such as toluene, xylene, dichlorobenzene or N-methylpyrrolidone. The tinctorial strength and transparency of the pigment can be influenced by varying the after-treatments.

Because of their fastness to light and migration, the colorants of the formula (I) are suitable for very diverse pigment applications. Thus, they can be used to prepare pigmented systems in which the pigmenting is very fast, such as mixtures with other substances, formulations, paints, printing pastes, coloured paper and coloured macromolecular substances. A mixture with other substances can be understood to mean, for example, a mixture with inorganic white pigments, such as titanium dioxide (rutile), or with cement. Formulations are, for example, flush pastes with organic liquids or pastes and fine pastes with water, dispersing agents and, optionally, preservatives. The term paint represents, for example, physically drying lacquers or lacquers which dry by oxidation, stoving lacquers, reactive lacquers, two-component lacquers, emulsion paints for weather-resistant coatings and distempers. Printing pastes are to be understood as meaning those for printing paper, textiles and tinplate. The macromolecular substances can be of natural origin, such as rubber, obtained by chemical modification, such as acetylcellulose, cellulose butyrate or viscose, or synthetically produced, such as polymers, polyaddition products and polycondensation products. Substances which may be mentioned are plastic masses such as polyvinyl chloride, polyvinyl acetate, polyvinyl propionate, polyolefins, for example polyethylene, or polyamides, high molecular weight polyamides, polymers and copolymers of acrylates, methacrylates, acrylonitrile, acrylamide, butadiene and styrene and also polyurethanes and polycarbonates. The substances pigmented with the products claimed can be in any desired form.

The pigments of the formula (I) are also outstandingly fast to water, fast to oil, fast to acid, fast to lime, fast to alkali, fast to solvents, fast to over-lacquering, fast to over-spraying, fast to sublimation, stable to heat and stable to vulcanising, are of high tinctorial strength and are readily dispersible in plastic masses.

EXAMPLE 1

(a) 11 g of 97% pure 1-amino-anthraquinone, 8.5 g of triethyl orthoformate and 120 g of nitrobenzene are stirred at 140°–145° C. for about 3 hours, the ethanol formed being distilled off via a bridge and the formation of the formimino-ester of the formula

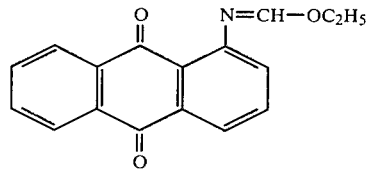

being followed by thin layer chromatography. After the 1-amino-anthraquinone has disappeared, 8.1 g of 2,6-dihydroxy-3-cyano-4-methyl-pyridine are added to the reaction mixture and the mixture is heated at 145°–150° C. for a further 2–3 hours. The mixture is then allowed to cool to 100° C. and the pigment, which has crystallised out as yellow-red prisms, is filtered off, washed with hot nitrobenzene and methanol and dried at 100° C.

17.4 g (92% of theory) of the reddish-tinged yellow pigment of the formula

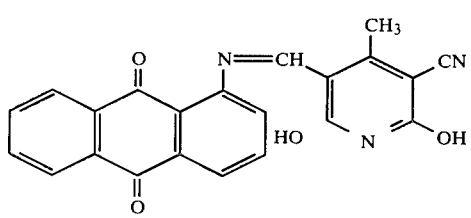

are thus obtained.

$C_{22}H_{13}N_3O_4$ (383): Calculated: C 68.93, H 3.39, N 10.97, O 16.71; Found: C 68.8, H 3.45, N 11.01, O 16.9

The pigment can also be present in the following tautomeric structures:

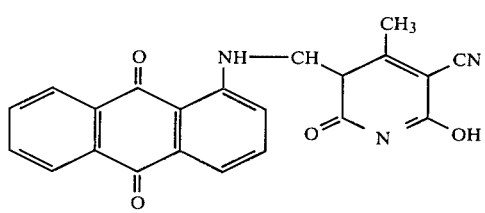

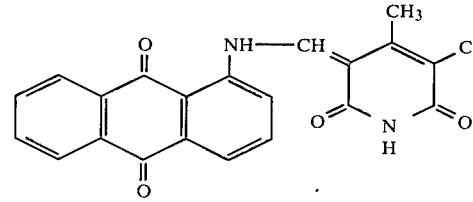

(b) 7.3 g of thionyl chloride are added in the course of 1 hour to 11 g of 97% pure 1-amino-anthraquinone, 4 g of dimethylformamide and 90 g of nitrobenzene, at 50°–60° C., and the mixture is stirred for about a further 1 hour until the formamidinium chloride of the formula

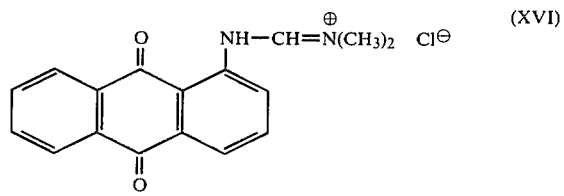

has formed. In order to remove the excess thionyl chloride, the mixture is stirred in vacuo for a further 1 hour and 8.1 g of 2,6-dihydroxy-3-cyano-4-methyl-pyridine and 12.5 g of anhydrous sodium acetate are then added successively to the reaction mixture and the resulting mixture is heated to 150°–160° C. in the course of about 1 hour. The mixture is stirred at 150°–160° C. until the formation of the pigment, which crystallises as yellow-red prisms, has ended and the pigment is then filtered off at 100° C., washed with hot nitrobenzene and with methanol and water and, after drying, 15.3 g (89% of theory) of the reddish-tinged yellow pigment identical to that from Example 1a are obtained.

Using the 2,6-dihydroxy-pyridines which are correspondingly substituted in the 3-position and 4-position and have the formula (IX)

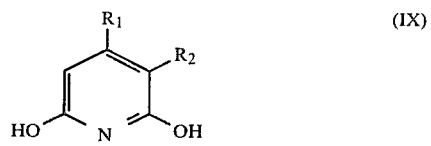

which are listed in the table which follows, anthraquinone pigments which correspond to the formula (XV) and have the indicated colour shades are obtained using 1-amino-anthraquinone in accordance with the processes described in Example 1a or 1b:

TABLE 1

| Example | $R_1$ | $R_2$ | Colour shade |
|---|---|---|---|
| 2 | H | CN | reddish-tinged yellow |
| 3 | $C_2H_5$ | CN | reddish-tinged yellow |
| 4 | $i-C_3H_7$ | CN | reddish-tinged yellow |
| 5 | $n-C_4H_9$ | CN | reddish-tinged yellow |
| 6 | $CH_3$ | $COOCH_3$ | yellow |
| 7 | $CH_3$ | $COO-CH_2-CH_2-OCH_3$ | yellow |
| 8 | $CH_3$ | COO—⟨phenyl⟩ | yellow |
| 9 | $CH_3$ | COO—⟨phenyl⟩—$CH_3$ | yellow |
| 10 | $CH_3$ | COO—⟨phenyl⟩—Cl | yellow |
| 11 | $CH_3$ | COO—⟨phenyl⟩(Cl,Cl) | yellow |
| 12 | $CH_3$ | COO—⟨phenyl⟩—$OCH_3$ | yellow |

EXAMPLE 13

5.5 g of 97% pure 1-amino-anthraquinone, 4.25 g of triethyl orthoformate and 75 g of nitrobenzene are heated at 140°-150° C. for about 2-3 hours, the ethanol formed being distilled off via a bridge. After the starting material has disappeared, 7 g of the compound of the formula

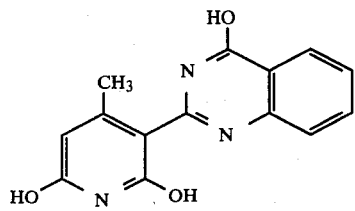
(XVII)

are introduced and the mixture is heated at 145°-150° C. for a further 4-5 hours. After cooling to 100° C., the pigment, which has crystallized as red prisms, is filtered off and washed with hot nitrobenzene and methanol and, after drying at 100° C., 11.44 g (92% of theory) of the red pigment of the formula

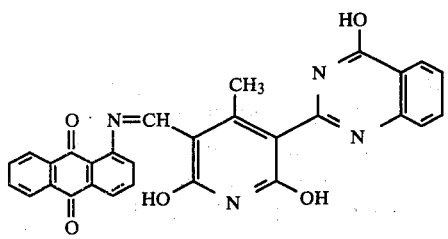
(XVIII)

are obtained.

Calculated: N 11.11 Found: N 11.28

Red pigments with similar characteristics are obtained when derivatives of the formulae given below are employed in place of the 2,6-dihydroxy-3-(4-hydroxy-2-quinazolinonyl)-4-methyl-pyridine mentioned above:

TABLE 2

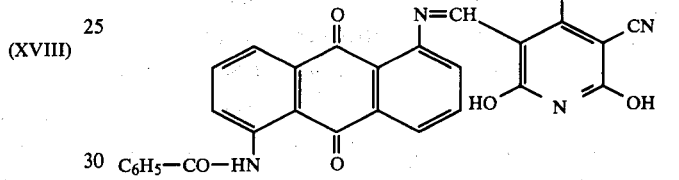

| Formula | $R_1$ | $R_3$ | $R_4$ | $R_5$ | $R_6$ |
|---|---|---|---|---|---|
| XIX | H | H | H | H | H |
| XX | $CH_3$ | H | $CH_3$ | H | H |
| XXI | $CH_3$ | Br | H | H | H |
| XXII | $CH_3$ | Cl | H | H | H |
| XXIII | $CH_3$ | H | Cl | H | H |
| XXIV | $C_2H_5$ | H | H | Cl | H |
| XXV | $CH_3$ | H | Cl | H | Cl |
| XXVI | $CH_3$ | H | $NO_2$ | H | H |
| XXVII | $CH_3$ | H | H | $NO_2$ | H |
| XXVIII | $CH_3$ | H | $NHCOCH_3$ | H | H |
| XXIX | $CH_3$ | H | H | $NHCOCH_3$ | H |

Pigments with excellent characteristics and similar colour shades are obtained when, in Examples 1-13, the 1-amino-anthraquinone derivatives which follow are employed in place of the 1-amino-anthraquinone used in the said examples: 1-amino-4-chloro-anthraquinone, 1-amino-5-chloro-anthraquinone, 1-amino-6(7)-chloro-anthraquinone, 1-amino-6,7-dichloro-anthraquinone, 1-amino-2,4-dibromoanthraquinone, 1-amino-6-fluoro-anthraquinone, 1-amino-4-nitro-anthraquinone, 1-amino-5-nitro-anthraquinone, 1-amino-anthraquinone-2-carboxylic acid amide and 1-amino-2-acetyl-anthraquinone.

EXAMPLE 14

9.8 g of 87% pure 1-amino-5-benzoylamino-anthraquinone and 4.4 g of triethyl orthoformate are heated in 75 g of nitrobenzene at 140°-150° C. for about 2-3 hours, the ethanol formed being distilled off via a short bridge. After the starting material has disappeared, 4.1 g of 2,6-dihydroxy-3-cyano-4-methyl-pyridine are introduced and the mixture is heated at 145°-150° C. for a further 4 hours. After cooling to 100° C., the pigment, which has crystallised as yellowish-tinged red needles, is filtered off and washed with hot nitrobenzene and methanol and, after drying at 100° C., 11.14 g (89% of theory) of the yellowish-tinged red pigment of the formula

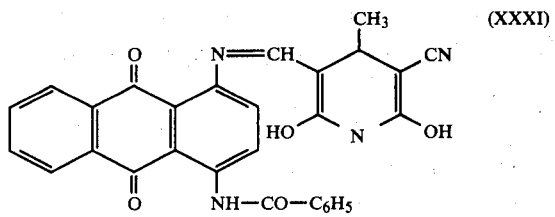
(XXX)

are obtained.

Calculated: N 11.16; Found: N 11.32

Trimethyl orthoformate can be employed in the example in place of triethyl orthoformate with equal success.

The pigment is obtained in similar yields when the following solvents are used in place of nitrobenzene: o-dichlorobenzene, 1,2,4-trichlorobenzene, diethylene glycol monoethyl ether, diethylene glycol dimethyl ether, dimethylformamide, N-methylpyrrolidone, dimethylsulphoxide and tetramethylenesulphone.

EXAMPLE 15

8.5 g of 95% pure 1-amino-4-benzoylamino-anthraquinone and 4.4 g of triethyl orthoformate are heated in 100 g of o-dichlorobenzene at 140°-150° C. for about 2-3 hours, the ethanol formed being distilled off via a short bridge. After the starting material has disappeared, 4.1 g of 2,6-dihydroxy-3-cyano-4-methyl-pyridine are introduced and the mixture is heated at 140°-150° C. for a further 4 hours. After cooling to 100° C., the pigment, which has crystallised as beautiful brown-red needles, is filtered off and washed with hot o-dichlorobenzene and methanol and, after drying at 100° C., 11.1 g (93.7% of theory) of the dark red pigment of the formula (XXXI)

are obtained.

Calculated: N 11.16, Found: N 11.0

Pigments with excellent characteristics and similar colour shades are obtained when 1-amino-4-(4-chlorobenzoylamino)-anthraquinone, 1-amino-4-(2,4-dichlorobenzoylamino)-anthraquinone, 1-amino-4-(3-nitrobenzoylamino)-anthraquinone or 1-amino-4-(4-acetylaminobenzoylamino)-anthraquinone is used in place of the abovementioned 1-amino-4-benzoylamino-anthraquinone.

EXAMPLE 16

11.8 g of 1-amino-4-hydroxy-anthraquinone, 8.5 g of triethyl orthoformate and 120 g of nitrobenzene are stirred at 140°–145° C. for about 3 hours, the ethanol formed being distilled off via a bridge. After the starting material has disappeared, 8.1 g of 2,6-dihydroxy-3-cyano-4-methylpyridine are introduced and the mixture is heated at 140°–150° C. for a further 4 hours. After cooling to 100° C., the pigment, which has crystallised as beautiful orangebrown needles, is filtered off and washed with hot nitrobenzene and methanol and, after drying at 100° C., 18 g (91% of theory) of the dark red pigment of the formula

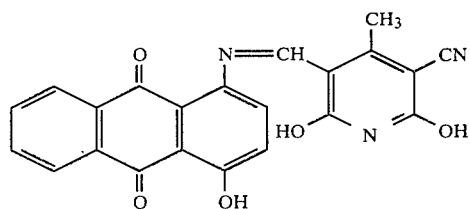

are obtained.

Calculated: N 10.53; Found: N 10.72

EXAMPLE 17

5.5 g of 1,5-diamino-anthraquinone and 8.8 g of triethyl orthoformate are heated in 80 g of nitrobenzene at 145°–150° C. for about 3 hours, the ethanol formed being distilled off via a bridge and the disappearance of the starting material being followed by thin layer chromatography. 8.1 g of 2,6-dihydroxy-3-cyano-4-methylpyridine are now added and the mixture is heated at 140°–150° C. until the formation of pigment has ended, which takes about 4 hours. The pigment, which has crystallised as dark brown prisms, is then filtered off at 120° C. and washed with hot nitrobenzene and methanol and, after drying at 100° C., 12.7 g (98.5% of theory) of the red-brown pigment of the formula

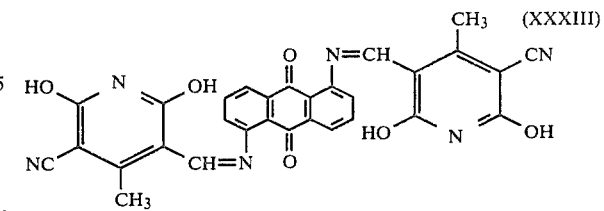

are obtained.

Calculated: N 15.05; Found: N 15.27

If, in Example 17, 5.5 g of 1,8-diamino-anthraquinone are used in place of the abovementioned 1,5-diamino-anthraquinone, 12.6 g (97.8% of theory) of the reddish-tinged brown pigment of the formula

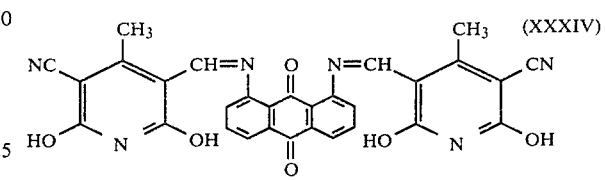

are obtained.

Calculated: N 15.05; Found: N 15.20

If, in Example 17, 5.5 g of 1,4-diamino-anthraquinone are employed in place of the abovementioned 1,5-diamino-anthraquinone, 12.7 g (98.5% of theory) of the black-brown pigment of the formula are obtained:

Calculated: N 15.05; Found: N 15.30

EXAMPLE 18

6.25 g of 1,5-diamino-4,8-dihydroxy-anthraquinone and 8.8 g of triethyl orthoformate are heated in 100 g of nitrobenzene at 145°–150° C. for about 3 hours, the ethanol formed being distilled off via a bridge and the disappearance of the starting material being followed by thin layer chromatography. 8.1 g of 2,6-dihydroxy-3-cyano-4-methylpyridine are now added and the mixture is heated at 160°–170° C. until the formation of pigment has ended. The pigment, which has crystallized as grey-blue crystals, is then filtered off at 120° C. and washed with hot nitrobenzene and methanol and, after drying at 100° C., 13.3 g (97.3% of theory) of the bluish-tinged grey pigment of the formula

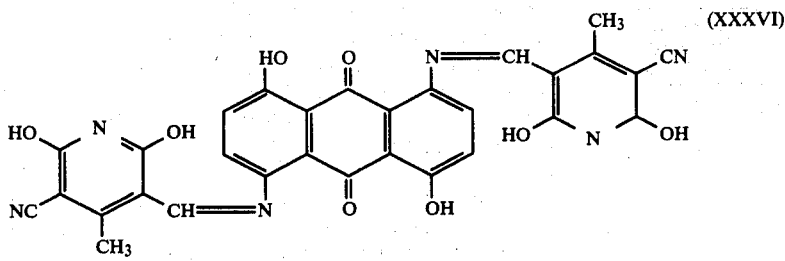

(XXXVI)

are obtained.

Calculated: N 14.24; Found: N 14.40

If, in Example 18, 6.25 g of 1,8-diamino-4,5-dihydroxy-anthraquinone are used in place of the 1.5-diamino-4,8-dihydroxy-anthraquinone, 12.85 g (94% of theory) of the greenish-tinged grey pigment of the formula

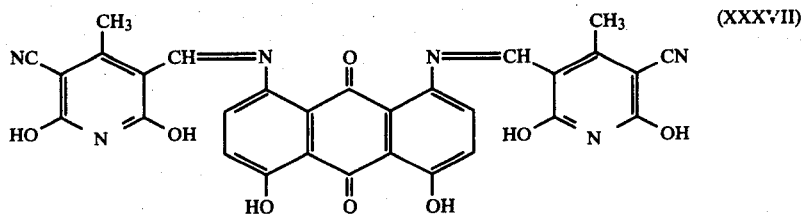

(XXXVII)

are obtained.

Calculated: N 14.24; Found: N 14.20

Pigments with excellent characteristics and similar colour shades are obtained when, in Example 18, 1.5-diamino-4,8-dihydroxy-x-bromo-anthraquinone or 1.8-diamino-4,5-dihydroxy-x-bromo-anthraquinone is employed in place of the 1,5-diamino-4,8-dihydroxy-anthraquinone used in the said example.

EXAMPLE 19

3.4 g of 1,4,5,8-tetraamino-anthraquinone, 9 g of triethyl orthoformate and 125 g of nitrobenzene are heated at 145°-150° C. for 3–4 hours, the ethanol formed being distilled off via a bridge and the disappearance of the starting material being followed by thin layer chromatography. 8.4 g of 2,6-dihydroxy-3-cyano-4-methyl-pyridine are now added and the mixture is heated at 175°-180° C. until the formation of the pigment, as blue-black prisms, has ended. The pigment is then filtered off at 120° C. and washed with hot nitrobenzene and methanol and, after drying at 100° C., 10.7 g (93% of theory) of the bluish-tinged grey pigment of the formula

EXAMPLE 20

13.37 g of 1-amino-4,5,8-trihydroxy-anthraquinone, 8.8 g of triethyl orthoformate and 80 g of nitrobenzene are heated at 145°-150° C. for about 3 hours, the ethanol formed being distilled off via a bridge and the disappearance of the starting material being followed by thin layer chromatography. 8.1 g of 2,6-dihydroxy-3-cyano-4-methyl-pyridine are now added and the mixture is heated at 155°-160° C. until the formation of the pigment has ended. After cooling to 110° C. the pigment, which has crystallised as brown prisms, is filtered off and washed with hot nitrobenzene and methanol and, after drying at 100° C., 19 g (84.9% of theory) of the brown pigment of the formula

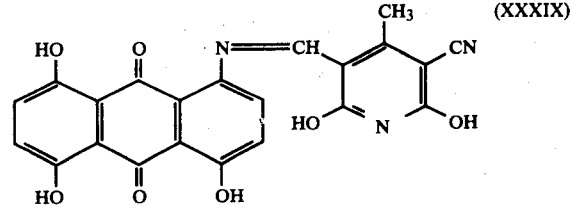

(XXXIX)

are obtained.

Calculated: N 9.74; Found: N 9.96

If, in Example 20, equivalent amounts of the aminoanthraquinones listed in Table 3 are used in place of 1-amino-4,5,8-trihydroxy-anthraquinone, correspond-

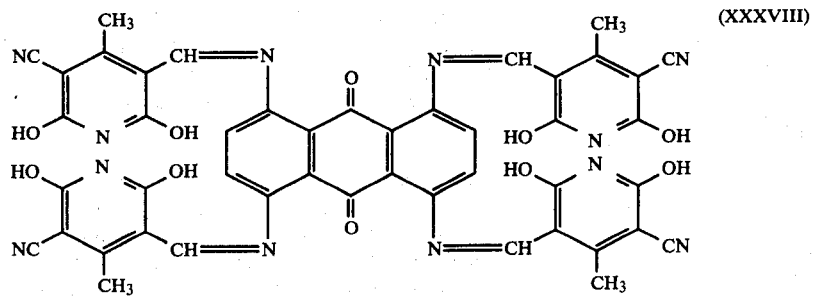

(XXXVIII)

are obtained.

Calculated: N 18.50; Found: N 18.21 ingly pigments are obtained in the colour shades indicated in the said table.

TABLE 3

| Example | Amino-anthraquinone | Colour shade of the resulting pigment |
|---|---|---|
| 21 | 1-Amino-5,8-dihydroxy-anthraquinone | violet |
| 22 | 1-Amino-2-bromo-4-hydroxy-anthraquinone | red |
| 23 | 1-Amino-4-anilino-anthraquinone | reddish-tinged grey |

EXAMPLE 24

8.5 g of 87% pure 1-amino-5-benzoylamino-anthraquinone and 4.4 g of triethyl orthoformate are heated in 75 g of nitrobenzene at 140°–150° C. for about 3 hours, the ethanol formed being distilled off via a bridge. After the starting material has disappeared, 7 g of the compound of the formula

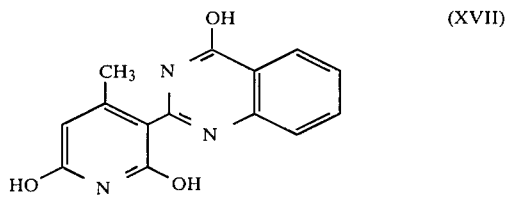

are introduced and the mixture is heated at 155°–160° C. until the formation of the pigment as small brown-red needles has ended. After cooling to 110°–120° C., the pigment is filtered off and washed with hot nitrobenzene and methanol, and, after drying at 100° C., 12.3 g (91.5% of theory) of the red-brown pigment of the formula

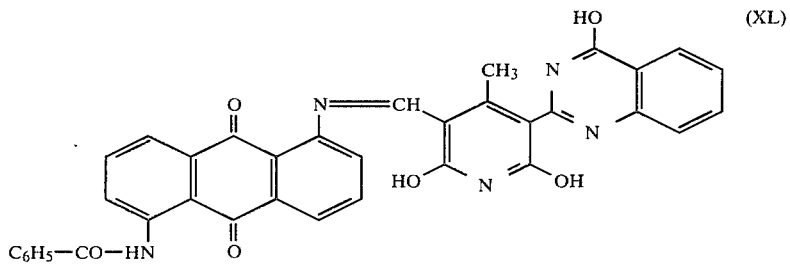

are obtained.

Calculated: N 11.27; Found: N 11.43

If, in Example 24, equivalent amounts of the amino-anthraquinones listed in Table 4 are used in place of 1-amino-5-benzoylamino-anthraquinone, corresponding pigments with the colour shades indicated in the said table are obtained.

TABLE 4

| Example | Amino-anthraquinone | Colour shade of the resulting pigment |
|---|---|---|
| 25 | 1-Amino-4-hydroxy-anthraquinone | violet |
| 26 | 1-Amino-4-benzoylamino-anthraquinone | reddish-tinged violet |
| 27 | 1,5-Diamino-anthraquinone | red |

EXAMPLE 28

(a) 8 g of the finely divided pigment obtained according to Example 1a are ground with a stoving lacquer of 25 g of coconut oil alkyd resin (40% of coconut oil), 10 g of melamine resin, 50 g of toluene and 7 g of glycol monomethyl ether on an automatic Hoover-Muller grinding machine. The mixture is introduced onto the substrate to be lacquer-coated, the lacquer is cured by stoving at 130° C. and reddish-tinged yellow lacquer coatings with very good fastness to over-lacquering and outstanding fastness to light and weathering are obtained.

Pigmented stoving lacquers with equal fastness properties are obtained when 15–25 g of the indicated alkyd resin or of an alkyd resin based on cottonseed oil, dehydrated castor oil, castor oil or synthetic fatty acids are used and, in place of the indicated amount of melamine resin, 10–15 g of the melamine resin mentioned or of a condensation product of formaldehyde with urea or with benzoguanamine are employed.

(b) If, in place of the indicated amount of pigment, 1 to 10 g of a mixture of titanium dioxide (rutile type) with the pigment indicated in Example 28a, in a ratio of 0.5–50:1, are ground in the laquer indicated in Example 28a, identical further processing gives lacquer coatings which have the same fastness properties and a reddish-tinged yellow colour shade which is shifted towards white with increasing titanium tioxide content.

EXAMPLE 29

6 g of the finely divided pigment according to Example 1a are ground in 100 g of a nitrocellulose lacquer which consists of 44 g of collodion wool (of low viscosity, 35% strength, butanol-moist), 5 g of dibutyl phthalate, 40 g of ethyl acetate, 20 g of toluene, 4 g of n-butanol and 10 g of glycol monomethyl ether. After spreading and drying reddish-tinged yellow lacquer coatings with outstanding fastness to light and over-lacquering are obtained. The same results are obtained when nitrocellulose lacquers with a nitrocellulose content of 10–15 g and a plasticiser content of 5–10 g and 70–85 g of a solvent mixture with the preferential use of aliphatic esters, such as ethyl acetate or butyl acetate, and aromatic compounds, such as toluene and xylene, and smaller proportions of aliphatic ethers, such as glycol ether, and alcohols, such as butanol, are used. Plasticisers can be understood to mean, for example: phthalic acid esters, such as dioctyl phthalate or dibutyl phthalate, esters of phosphoric acid, and castor oil, on its own or in combination with oil-modified alkyd resins.

Lacquer coatings with similar fastness properties are obtained using other physically drying spirit lacquers, lacquer dopes and nitrocellulose lacquers, air-drying oil varnishes, synthetic resin lacquers and nitrocellulose combination lacquers and oven-drying and air-drying epoxide resin lacquers, optionally in combination with urea resins, melamine resins, alkyd resins or phenol resins.

EXAMPLE 30

5 g of the pigment according to Example 1a, which has been brought into a state of fine division, are ground in 100 g of a paraffin-free drying unsaturated polyester resin in a porcelain ball mill. 10 g of styrene, 59% of melamine-formaldehyde resin and 1 g of a paste of 40 g of cyclohexanone peroxide and 60% of dibutyl phthalate are stirred well with the ground mixture and finally 4 g of drying solution (10% strength cobalt naphthenate in test benzine) and 1 g of silicone oil solution (1% strength in xylene) are admixed. The mixture is applied to primed wood and a high-gloss, water-resistant, reddish-tinged yellow lacquer coating which is fast to weathering and has outstanding fastness to light is obtained.

If, in place of the reactive lacquer based on unsaturated polyester resins, amine-curing epoxide resin lacquers with dipropylenediamine as the amino component are used, reddish-tinged yellow lacquer coatings with outstanding fastness to weathering and fastness to efflorescence are obtained.

EXAMPLE 31

100 g of a 65% strength solution of an aliphatic polyester containing about 8% of free hydroxyl groups in glycol monomethyl ether-acetate are ground with 5 g of the pigment obtained according to Example 1a and then mixed well with 44 g of a 67% strength solution of the reaction product of 1 mol of trimethylolpropane and 3 mols of toluylene diisocyanate. Without an impairment in the pot life, application of the mixture and reaction of the components results in high-gloss, reddish-tinged yellow polyurethane lacquer coatings with outstanding fastness to efflorescence, light and weathering.

Pigmentations of similar fastness are obtained using other two-component lacquers based on aromatic or aliphatic isocyanates and hydroxyl group-containing polyethers or polyesters, and also with polyisocyanate lacquers which give moisture-drying polyurea lacquer coatings.

EXAMPLE 32

5 g of a fine paste, obtained by kneading 50 g of the pigment obtained according to Example 1a with 15 g of an arylpolyglycol ether emulsifier and 35 g of water are mixed with 10 g of barytes as the filler, 10 g of titanium dioxide (rutile type) as the white pigment and 40 g of an aqueous emulsion paint containing about 50% of polyvinyl acetate. The paint is spread and, after drying, reddish-tinged yellow coats of paint with very good fastness to lime and cement and also outstanding fastness to weathering and light are obtained.

The fine paste obtained by kneading is likewise suitable for pigmenting clear polyvinyl acetate emulsion paints, for emulsion paints which contain copolymers of styrene and maleic acids as the binder and also emulsion paints based on polyvinyl propionate, polymethacrylate or butadiene-styrene.

EXAMPLE 33

10 g of the pigment paste mentioned in Example 32 are mixed with a mixture of 5 g of chalk and 5 g of 20% strength size solution. This gives a reddish-tinged yellow wallpaper paint, with which coatings of outstanding fastness to light are obtained. Other non-ionic emulsifiers, such as the reaction products of nonylphenyol with ethylene oxide, or ionic wetting agents, such as the sodium salts of alkylarylsulphonic acids, for example of dinaphthylmethanedisulphonic acid, sodium salts of substituted sulphonic acid esters and sodium salts of paraffinsulphonic acids in combination with alkylpolyglycol ethers, can also be used to prepare the pigment paste.

EXAMPLE 34

A mixture of 65 g of polyvinyl chloride, 35 g of diisooctyl phthalate, 2 g of dibutyl-tin mercaptide, 0.5 g of titanium dioxide and 0.5 g of the pigment of Example 1a is coloured in a mixing roll mill at 165° C. An intensely reddish-tinged yellow coloured mass is obtained which can be used to prepare films or mouldings. The coloration is distinguished by outstanding fastness to light and very good fastness to plasticisers.

EXAMPLE 35

0.2 g of the pigment according to Example 1a is mixed with 100 g of polyethylene, polypropylene or polystyrene granules. The mixture can either be sprayed at 220° to 280° C. direct in an injection moulding machine, or can be processed in an extruder to coloured rods or processed in a mixing roll mill to coloured skins. The rods and skins are optionally granulated and the granules are sprayed in an injection moulding machine.

The reddish-tinged yellow mouldings possess very good fastness to light and to migration. In a similar manner, synthetic polyamides of caprolactam or adipic acid and hexamethylenediamine or the condensation products of terephthalic acid and ethylene glycol can be coloured at 280°–300° C., if appropriate under a nitrogen atmosphere.

EXAMPLE 36

1 g of the pigment according to Example 1a, 10 g of titanium dioxide (rutile type) and 100 g of a copolymer which is based on acrylonitrile/butadiene/styrene and is in powder form are mixed and the mixture is coloured on a roll mill at 140°–180° C. a reddish-tinged yellow coloured skin is obtained and this is granulated and the granules are sprayed in an injection moulding machine at 200°–250° C. Reddish-tinged yellow mouldings with very good fastness to light and to migration and excellent stability to heat are obtained.

In a similar manner, but at temperatures of 180°–220° C. and without the addition of titanium dioxide, plastics based on cellulose acetate, cellulose butyrate and mixtures thereof are coloured, with similar fastness properties.

EXAMPLE 37

0.2 g of the pigment according to Example 1a is mixed, in the finely divided form, with 100 g of a plastic based on polycarbonate, in an extruder or in a kneading screw, at 250°–280° C. and the mixture is processed to granules. Reddish-tinged yellow, transparent granules with outstanding fastness to light and stability to heat are obtained.

EXAMPLE 38

90 g of a slightly branched polypropylene glycol with a molecular weight of 2,500 and a hydroxyl number of 56, 0.25 g of endoethylenepiperazine, 0.3 g of tin-II octoate, 1.0 g of a polyether-siloxane, 3.5 g of water and 12.0 g of a ground mixture of 10 g of the pigment according to Example 1a in 50 g of the indicated polypropylene glycol are mixed together well and the mixture is then intimately mixed with 45 g of toluylene diisocyanate (80% of the 2,4-isomer and 20% of the 2,6-isomer) and the mixture is poured into a mould. The mixture becomes turbid after 6 seconds and foam formation takes place. After 70 seconds, an intensely reddish-tinged yellow coloured, soft polyurethane foam has formed, the pigmentation of which displays outstanding fastness to light.

EXAMPLE 39

90 g of a slightly branched polyester of adipic acid, diethylene glycol and trimethylolpropane, with a molecular weight of 2,000 and a hydroxyl number of 60, are mixed with the following components: 1.2 g of dimethylbenzylamine, 2.5 g of sodium castor oil-sulphate, 2.0 g of an oxethylated, benzylated oxydiphenyl, 1.75 g of water and 12 g of a paste prepared by grinding 10 g of the pigment according to Example 1a in 50 g of the polyester indicated above. After mixing, 40 g of toluylene diisocyanate (65% of the 2,4-isomer and 35% of the 2,6-isomer) are stirred in, whilst stirring, and the mixture is poured into a mould and foamed. After 60 seconds, a reddish-tinged yellow coloured, soft polyurethane foam has formed, the coloration of which is distinguished by very good fastness properties to light.

EXAMPLE 40

Using a printing paste prepared by grinding 35 g of the pigment according to Example 1a and 65 g of linseed oil and adding 1 g of a siccative (Co naphthenate, 50% strength in test benzine), reddish-tinged yellow offset prints of high billiancy and depth of colour and very good fastness to light and lacquering are obtained. The use of this printing paste in letterpress printing, collotype printing, lithography or dyestamping results in reddish-tinged yellow prints with similar fastness properties. If the pigment is used for colouring tinplate printing pastes or gravure printing pastes of low viscosity or printing inks, reddish-tinged yellow prints with similar fastness properties are obtained.

EXAMPLE 41

A printing paste is prepared from 10 g of the pigment fine paste indicated in Example 32, 100 g of 3% strength tragacanth, 100 g of an aqueous 50% strength egg albumin solution and 25 g of a non-ionic wetting agent. A textile fibre fabric is printed and steamed at 100° C. and a reddish-tinged yellow print is obtained which is distinguished by outstanding fastness properties, especially fastness properties to light. In the print batch, other binders which can be used for fixing on the fibre, for example those based on synthetic resin, British gum or cellulose glycolate, can be used in place of the tragacanth and egg albumin.

EXAMPLE 42

A mixture of 100 g of light crepe, 2.6 g of sulphur, 1 g of stearic acid, 1 g of mercaptobenzthiazole, 0.2 g of hexamethylenetramine, 5 g of zinc oxide, 60 g of chalk and 2 g of titanium dioxide (anatase type) is coloured on a mixing roll mill at 50° C. and with 2 g of the pigment obtained according to Example 1a and is then vulcanised for 12 minutes at 140° C. A reddish-tinged yellow coloured vulcanised product with very good fastness to light is obtained.

EXAMPLE 43

22.5 l of an aqueous, approximately 9% strength viscose solution is added, in a stirrer, to 100 g of a 20% strength aqueous paste of the pigment according to Example 1a, for example prepared by dissolving the colorant in 96% strength sulphuric acid, discharging the solution onto ice, filtering and washing the material on the filter with water until neutral. The coloured mass is stirred for 15 minutes and is then de-aerated and subjected to a spinning and desulphurising process. Yellowish-tinged red filaments or films with very good fastness to light are obtained.

EXAMPLE 44

10 kg of a paper pulp containing 4 g of cellulose per 100 g are treated in a Hollander for about 2 hours. During this time, the following are added at quarter hour intervals: 4 g of resin size, then 30 g of an approximately 15% strength pigment dispersion, obtained by grinding 4.8 g of the pigment obtained according to Example 1a with 4.8 g of dinaphthylmethanedisulphonic acid and 22 g of water in a ball mill, and then 5 g of aluminium sulphate.

After finishing on a paper machine, a reddish-tinged yellow coloured paper with outstanding fastness to light is obtained.

EXAMPLE 45

The yellow pigmented paper prepared according to Example 44 is saturated with a 55% strength solution of a urea/formaldehyde resin in n-butanol and baked at 140° C. A reddish-tinged yellow laminated paper with very good fastness to migration and outstanding fastness to light is obtained.

A laminated paper of equal fastness is obtained by laminating a paper which has been printed by the gravure printing process using a printing paste which contains the yellow pigment fine paste indicated in Example 28 and water-soluble or saponifiable binders.

EXAMPLE 46

20 g of the pigment obtained according to Example 1a are finely dispersed, in a bead mill, in 50 g of dimethylformamide, using a dispersing aid consisting of 50 g of a 10% strength solution of polyacrylonitrile in dimethylformamide. The pigment concentrate thus obtained is added in a known manner to a spinning solution of polyacrylonitrile and the solution is homogenised and then spun to filaments by known dry spinning processes or wet spinning processes.

Reddish-tinged yellow coloured filaments are obtained, the colorations of which are distinguished by very good fastness to rubbing, fastness to washing, fastness to migration, fastness to heat, fastness to light and fastness to weathering.

We claim:

1. Anthraquinone derivatives which in one of their tautomeric structures correspond to the formula

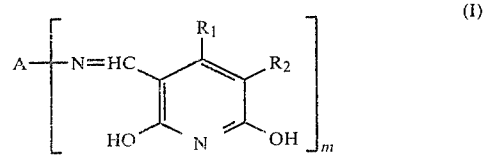

in which
A denotes an anthraquinone radical which is free from sulphonic acid groups, is optionally further substituted and preferably consists of at most 5 fused rings,
m is a number from 1–4,
$R_1$ is hydrogen or $C_1$–$C_4$-alkyl group and
$R_2$ is a cyano group or a radical of the formula —COOR$_3$ or (II)

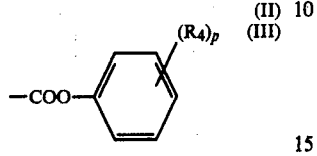

or a radical of the formula

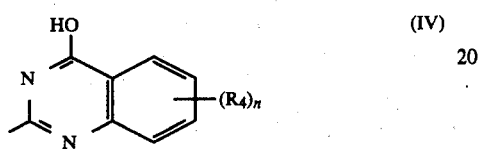

in which formulae
$R_3$ is hydrogen, a straight-chain or branched alkyl group or a cycloalkyl radical,
$R_4$ is halogen, $C_1$–$C_4$ alkyl, $C_1$–$C_4$ alkoxy, nitro, trifluoromethyl, cyano, unsubstituted carbamoyl, unsubstituted sulfamoyl, substituted carbamoyl or substituted sulfamoyl where the substituents are $C_1$ to $C_4$ alkyl, phenyl, benzyl which in turn can be optionally substituted by $C_1$ to $C_4$ alkyl, $C_1$ to $C_4$ alkoxy, fluorine, chlorine, bromine, or nitro or
$R_4$ can be acylamino wherein the acyl group is ($C_1$ to $C_4$-alkyl)-carbonyl or benzoyl which in turn can be optionally substituted in the benzene nucleus by $C_1$ to $C_4$ alkyl, chloro, $C_1$ to $C_4$ alkoxy or nitro or
$R_4$ can be arylamino which in turn can be optionally substituted by $C_1$ to $C_4$ alkyl, $C_1$ to $C_4$ alkoxy fluorine, chlorine, bromine or nitro,
n is 0, 1, 2, 3 or 4 and
p is 0, 1, 2, 3, 4 or 5.

2. Anthraquinone derivatives which in one of their tautomeric structures correspond to the formula

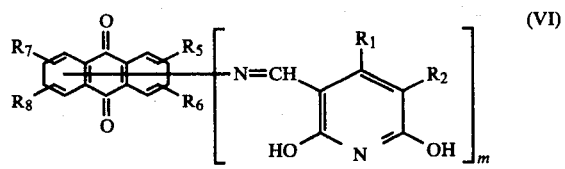

in which
$R_1$, $R_2$ and m have the meaning indicated in claim 1 and
$R_5$ denotes hydrogen, halogen, such as fluorine, chlorine and bromine, nitro, $C_1$–$C_4$-alkyl, $C_1$–$C_4$-alkoxy, $C_1$–$C_4$-alkylamino, benzylamino, cyclohexylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, ($C_1$–$C_4$-alkyl)-carbonyl, ($C_1$–$C_4$-alkoxy)-carbonyl, phenylamino which is optionally substituted by $C_1$–$C_4$-alkyl, $C_1$–$C_4$-alkoxy, chlorine or nitro, carboxamide which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine, bromine or nitro, carboxyl, hydroxyl, $C_1$–$C_4$-carbonylamino or benzoylamino which is optionally substituted by $C_1$–$C_4$-alkyl, $C_1$–$C_4$-alkoxy, chlorine, bromine or nitro, phenylsulphonylamino substituted $C_1$–$C_4$-alkyl, $C_1$–$C_4$-alkoxy, fluorine, chlorine, bromine or nitro, $R_6$ is hydrogen, chlorine or hydroxyl, $R_7$ is hydrogen, halogen, such as fluorine, chlorine or bromine, nitro, $C_1$–$C_4$-alkyl, $C_1$–$C_4$-alkoxy, $C_1$–$C_4$-alkylamino, $C_1$–$C_4$-alkylmercapto, phenylmercapto which is optionally substituted by $C_1$–$C_4$-alkyl, $C_1$–$C_4$-alkoxy, fluorine, chlorine, bromine or nitro, ($C_1$–$C_4$-alkoxy)-carbonyl, ($C_1$–$C_4$-alkyl)-carbonyl, benzylamino, cyclohexylamino phenylamino which is optionally substituted by $C_1$–$C_4$-alkyl, $C_1$–$C_4$-alkoxy, chlorine, bromine or nitro, carboxyl, hydroxyl, carbamoyl which is optionally monosubstituted or disubstituted by $C_1$–$C_4$-alkyl, benzyl or phenyl, it being possible for phenyl to be substituted by $C_1$–$C_4$-alkyl, $C_1$–$C_4$-alkoxy, fluorine, chlorine. bromine or nitro, ($C_1$–$C_4$-alkyl)-carbonylamino, benzoylamino which is optionally substituted by $C_1$–$C_4$-alkyl, $C_1$–$C_4$-alkoxy, chlorine, bromine or nitro, $C_1$–$C_4$-alkylsulphonylamino or phenylsulphonylamino which is optionally substituted by $C_1$–$C_4$-alkyl, $C_1$–$C_4$-alkoxy, fluorine, chlorine, bromine or nitro, and
$R_8$ is hydrogen, halogen, such as fluorine, chlorine and bromine, or hydroxyl.

3. Anthraquinone derivatives which in one of their tautomeric structures correspond to the formula

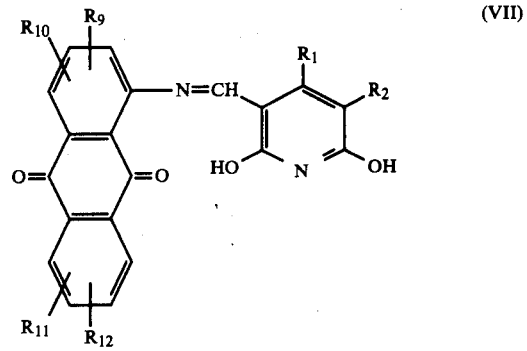

in which
$R_1$ and $R_2$ have the meaning indicated in claim 1 and $R_9$, and $R_{10}$ $R_{11}$ and $R_{12}$ denote hydrogen, chlorine, bromine, carboxyl, $C_1$–$C_4$-alkoxycarbonyl, carbamoyl, ($C_1$–$C_4$-alkyl)-carbonylamino, benzoylamino which is optionally substituted by 1 or 2 nitro or 1 to 5 chlorines or bromines, $C_1$–$C_4$ alkylsulphonylamino or phenylsulphonylamino which is optionally substituted by methyl, methoxy or chlorine, or a radical of the formula

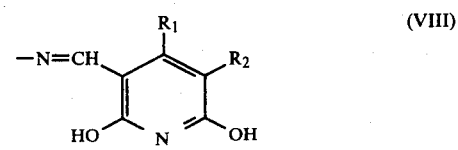

4. Process for the preparation of anthraquinone pigments, characterised in that amino-anthraquinones of the formula A—NH$_2$)$_m$ (V)

in which

A and m have the meaning indicated in claim 1, are subjected to a condensation reaction with 2-hydroxy-5-alkoxymethylene-6-oxo-5,6-dihydro-pyridines of the formula

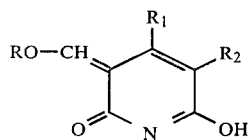

(XI)

in which

R preferably represents a C$_1$–C$_4$-alkyl group and

R$_1$ and R$_2$ have the meaning indicated in claim 1, in an organic reaction medium at 100°–220° C.

5. Process for the preparation of anthraquinone pigments, characterised in that formimino-esters of aminoanthraquinones of the formula A—N=CH—OR)$_m$ (XII)

in which

A and m have the meaning indicated in claim 1 and

R represents a C$_1$–C$_4$-alkyl group, are subjected to a condensation reaction with 2,6-dihydroxypyridines of the formula

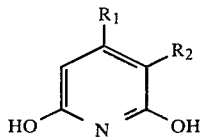

(IX)

in which R$_1$ and R$_2$ have the meaning indicated in claim 1, in an organic reaction medium at 100°–220° C.

6. Process for the preparation of anthraquinone pigments, characterised in that formamidines of aminoanthraquinones of the formula A—N=CH—N(R)$_2$]$_m$ (XIII)

in which

A and m have the meaning indicated in claim 1 and

R represents a C$_1$–C$_4$-alkyl group, are subjected to a condensation reaction with 2,6-dihydroxypyridines of the formula

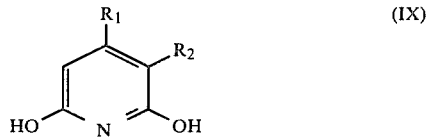

in which

R$_1$ and R$_2$ have the meaning indicated in claim 1, in an organic reaction medium at 100°–220° C.

7. A process for pigmenting an organic macromolecular substance selected from the group consisting of cellulose butyrate, acetyl rubber cellulose, viscose, a poly addition polymer or a polycondensation polymer which comprises adding to said organic macro-molecular substance an anthraquinone derivative according to claim 1.

8. A process according to claim 7, wherein organic macro-molecular substance is selected from the group consisting of polyvinyl chloride, polyvinyl acetate, polyvinyl propionate, polyolefin, polyamide, a polymer or copolymer of an acrylate, acrylonitrile, acrylamide, a polymer of butadiene or styrene or polyurethane or polycarbonate.

9. An organic macro-molecular material selected from the group consisting of acetyl rubber cellulose, cellulose butyrate, viscose poly addition or polycondensation polymer pigmented with the anthraquinone derivative of claim 1.

10. An organic macro-molecular material according to claim 9, wherein said macro-molecular material is selected from the group consisting of polyvinyl chloride, polyvinyl acetate, polyvinyl propionate, polyolefin, polyamide, a polymer or copolymer of an acrylate, a polymer or copolymer of acrylonitrile, a polymer or copolymer of acrylamide, a polymer or copolymer of butadiene or styrene, a polyurethane and a polycarbonate.

11. An anthraquinone derivative according to claim 1, wherein A consists of at most 5 fused rings.

* * * * *

UNITED STATES PATENT AND TRADEMARK OFFICE
CERTIFICATE OF CORRECTION

PATENT NO. : 4,284,411
DATED : August 18, 1981
INVENTOR(S) : RUTGER NEEFF; MEINHARD ROLF; WALTER MÜLLER It is certified that error appears in the above—identified patent and that said Letters Patent is hereby corrected as shown below:

Col. 1, line 44, should be-- -COOR$_3$ II or III--

Col. 1, line 64, "acrylamino" should be --arylamino--.

Col. 16, line 20, "laquer" should be --lacquer--

Col. 19, line 62, "hexamethylenetramine" should be --hexamethylenetetramine--.

Col. 23, line 27, "(" should be inserted between "A" and "N"

Col. 23, line 47, "[" should be inserted between "A" and "N"

Signed and Sealed this

Twenty-ninth Day of December 1981

[SEAL]

Attest:

GERALD J. MOSSINGHOFF

Attesting Officer

Commissioner of Patents and Trademarks